United States Patent Office 3,325,099
Patented June 13, 1967

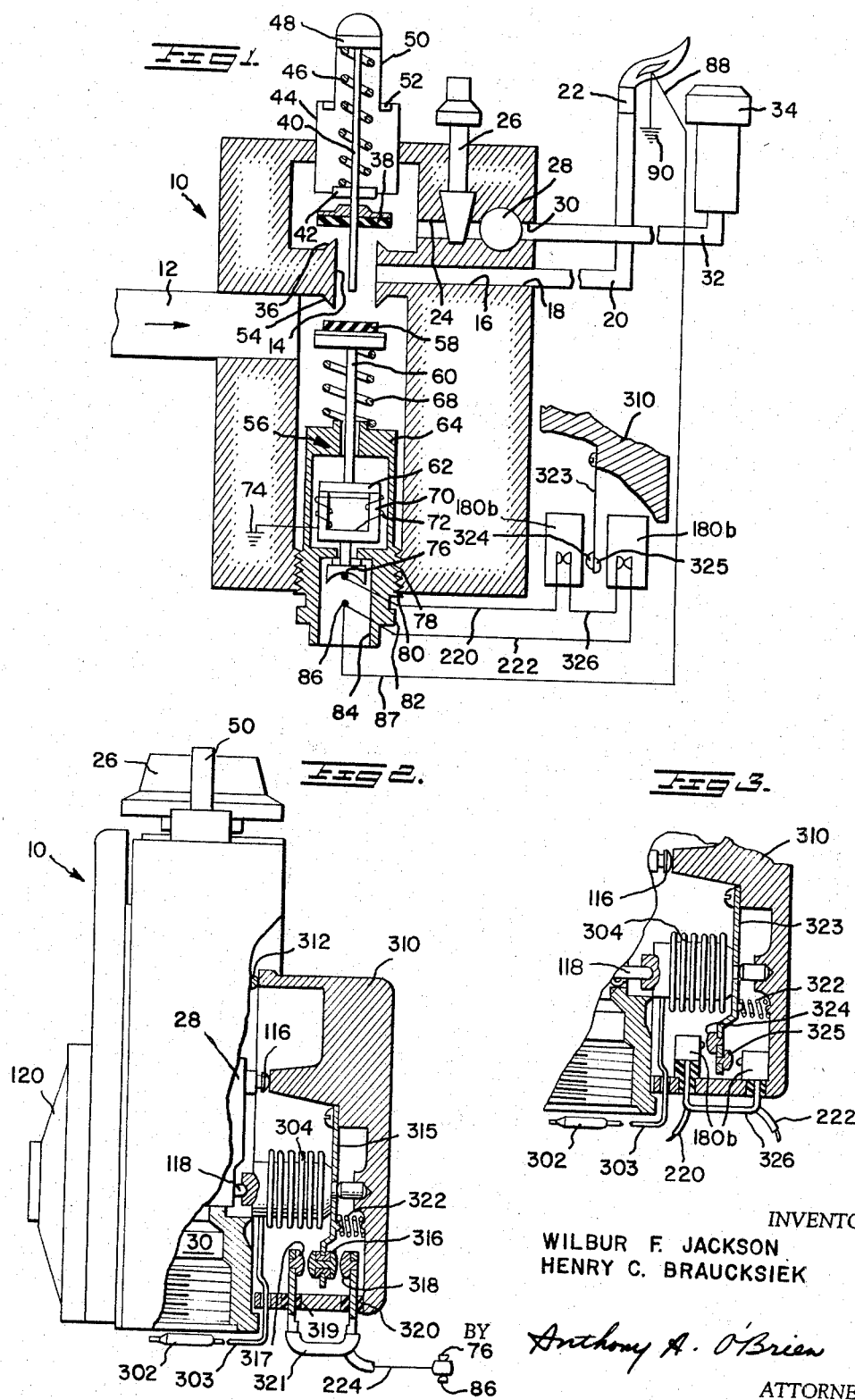

3,325,099
THERMOSTATIC CONTROL WITH LIMIT SWITCH
Wilbur F. Jackson, Rolling Hills, and Henry C. Braucksiek, Buena Park, Calif., assignors to Robertshaw Controls Company, Richmond, Va., a corporation of Delaware
Filed June 6, 1966, Ser. No. 555,610
4 Claims. (Cl. 236—21)

This application is a continuation-in-part of application Ser. No. 287,061, filed June 11, 1963, now Patent 3,286,923 dated Nov. 22, 1966. The present invention relates to a thermostatic control device and, more particularly, to a unitary control device embodying a bellows type thermostat and high limit switch means.

In modern heating appliances, such as space heaters and hot water heaters, it is standard practice to control a supply of fuel to a main burner and to a pilot burner, with the main burner flow being thermostatically controlled and the pilot burner flow being controlled by a thermoelectric safety device that shuts off flow to both burners. The thermoelectric safety device conventionally includes a valve member operatively associated with an armature that is biased to a valve closing position but is retained in a valve opening position when an electromagnet is energized by a thermocouple responding to the flame at the pilot burner; the voltage generated by the thermocouple is great enough to hold the armature in its valve open position but is not great enough to attract the armature, so reset means is utilized to move the biased armature against the electromagnet. As long as the electromagnet is energized, the main burner flow is thermostatically controlled by a thermostat unit.

Explosions from dangerously high temperatures being developed in the hot water tank have presented a problem which has been recognized by the prior art. For example, U.S. Pat. No. 2,781,977 includes a lower cycling thermostat and a thermostatic switch that is attached to the upper exterior of the hot water tank and is connected in series with the thermoelectric circuit. While this arrangement presents some protection against abnormal temperature conditions, it includes certain disadvantages such as cost of installation and being responsive only to the temperature at the top of the hot water tank.

The use of a temperature responsive bellows type actuator in a thermostatic control device for fuel burner control systems has not been subject to widespread adaptation because of the need for complex fail safe features. For instance, such bellows arrangement include a sensing bulb and bellows connected by a capillary tube, all of which are filled with a thermally expanding liquid so that temperature variations sensed by the bulb effect expansion and contraction of the bellows. Failure of the bellows would result in leakage of the thermal liquid so that the main control device would keep the burner apparatus in operation.

It is, therefore, an object of the present invention to provide a thermostatic control with additional safeguards against overheating in case of failure of conventional safety devices.

The present invention has another object in that means for interrupting electrical flow may be affected by movement of a thermal responsive actuating element used on a thermostatic control device, which interrupting means when actuated by the thermal responsive actuating element would thereby operate as an automatic pilot gas shut-off.

Another object of this invention is to provide a bellows type thermostatic control device with a simple fail safe feature.

Another object of the present invention is to actuate a high limit switch in response to excessive movement of a bellows in a thermostatic control device.

A further object of the present invention is to actuate a high limit switch in response to excessive expansion or contraction of a bellows in a thermostatic control device.

Other features and advantages of this invention will become apparent from the following detailed description and the accompanying drawing of which:

FIG. 1 is a schematic diagram of a fuel burner control system embodying the present invention;

FIG. 2 is an elevation view with parts in section of the gas valve of FIG. 1 wherein the temperature sensor is a bulb and bellows; and FIG. 3 is a partial longitudinal section of another embodiment of the present invention wherein the temperature sensor of FIG. 2 is a thermal element operating a pair of switches.

As is illustrated in FIG. 1, the present invention is embodied in a control device including a casing, indicated generally at 10, having an inlet port 12 for receiving fuel from a gas source and communicating with a common internal passage 14 from which a pair of branch passages are controlled. One branch passage defines a pilot flow passage 16 leading to a pilot flow outlet port 18 which communicates with a conduit 20 for supplying fuel to a pilot burner 22; the other branch passage defines a main flow passage 24 that is controlled by a manually operable on-off valve 26 and a thermostatically operated valve 28, which valves are upstream of a main flow outlet port 30 that communicates with a conduit 32 for supplying fuel to a main burner 34.

The pilot flow passage 16 communicates with the common passage 14 intermediate its opposite ends which define upstream and downstream valve seats. The downstream valve seat 36 is controlled by combined reset and valve means which includes a valve member 38 carried adjacent one end of a reset stem 40. The upper end of the stem 40 extends through a sealing collar 42 on a plunger housing 44 in which a coil spring 46 encircles the stem 40 and is mounted in compression between the collar 42 and a disc 48 on the end of the stem 40. The stem 40 is retained in the housing 44 by means of a hollow push button 50 which receives the stem disc 48 and which includes an annular bottom flange 52 engaging the housing wall surrounding an opening therefor.

The upstream valve seat 54 is controlled by an electromagnetic device, indicated generally at 56, having a safety shut-off valve member 58 movably disposed for cooperation with the valve seat 54. The valve member 58 is fixed to one end of an armature stem 60 which has its other end fixed to an armature 62 located in a fixed magnet housing 64 so that the stem 60 is slidably disposed relative to the housing 64. A coil spring 68 surrounds one end of the armature stem 60 and is mounted in compression between the top end wall of the magnet housing 64 and the rear surface of the valve member 58 which is thus biased to a closed position against the valve seat 54. The valve member 58, stem 60 and armature 62 reciprocate as a unit between released and attracted positions relative to fixed electromagnetic means in the form of a generally U-shaped magnet core 70 and an electric coil 72 wound thereon. One end of electric coil 72 is connected to a ground terminal 74 and the other end is connected to an electrical conductor 76.

As is shown in FIG. 1, the bottom end wall of the magnet housing 64 is defined by support means in the form of a magnet base 78 having external threads so that the entire assembly 56 may be threaded into a suitable opening in the casing 10. In order to prevent any fuel leakage from such opening, the threads are provided with a sealing compound and a tapered sealing lip 80 on the periphery of the magnet base 78 which has a seal tight relationship with the periphery of such opening.

The conductor 76 extends through the top portion of the base 78 and has a concave surface disposed in the upper part of a cavity formed in the bottom portion of the base 78. A hexagonal periphery 82 on the exterior of the base bottom portion receives a wrench or tool for tightening the assembly 56 in the threaded opening of the casing 10. The bottom of base 78 has a threaded opening 84 which receives a thermocouple cable connector (not shown) having a conductor 86; a thermocouple lead 87 from one side of a thermocouple 88 extends to such conductor 86 while the other side of the thermocouple 88 is connected to a ground terminal 90. The thermocouple 88 is mounted in the proximity of the pilot burner 22 so as to be heated from the flame thereof.

As is illustrated in FIG. 2, the thermostatic means includes a bulb 302, capillary tube 303 and bellows 304, which is used for changing the position of the valve 28 within the thermostatic control device 10 that is best used for such things as space heating apparatus. This control is illustrated and described in U.S. Pat. No. 2,975,974 to Jackson et al. and is not being described in full here; only those parts necessary to understand the present invention are being repeated. Temperature variations sensed by the bulb 302, will change the volume of a charged fluid within the system and correspondingly expand or contract the bellows 304 mounted within the control. Expansion of the bellows 304 tends to rotate the housing 310 counterclockwise about rib 312, which operates the actuator 116 and allows the valve 28 to be closed by its biasing spring as described in the above Jackson et al. patent. The front end of the bellows 304 engages the end of an adjusting shaft 118 which is axially movable by means of a temperature setting dial 120.

An arm 315 has one end fixedly attached to the housing 310 and is biased by a coil spring 322 against the rear of the bellows 304; the free end of arm 315 extends downwardly and terminates in a double faced contact 316. A pair of grounding contacts 317 and 318 are each disposed in the housing 310 by being mounted in a pair of insulating bushings 319 and 320, respectively which are carried by a base plate fixed to a rear wall (FIGS. 2 and 3) of control device 10 and which are connected together by a lead 321 from which a single insulated lead 224 extends. The other end of lead 224 forms a conductive connector between the thermocouple cable conductor 86 and the conductor 76 of the electromagnetic core 70. This arrangement describes a shorting circuit for the electromagnetic coil 72, while the circuitry of FIGS. 1 and 3 relates to a breaking circuit as will be described more fully hereinafter.

To place the system of FIGS. 1 and 2 in operation, the manual valve 26 is rotated to an on position and the temperature setting dial 120 for the thermostatically operated valve 28 is moved to a selected temperature which is desired to be maintained by cyclic operation of the main burner 34. The reset button 50 is manually depressed whereby the valve member 38 is closed on valve seat 36 to prevent any fuel flow through the main flow passage 24 during lighting and whereby the lower end of the reset stem 40 moves the valve member 58, stem 60 and armature 62 as a unit against the bias of coil spring 68 to an attracted or valve open position permitting a fuel flow through the pilot flow passage 16 to the pilot burner 22 where it is ignited as by a match. As soon as the thermocouple 88 is heated sufficiently by the pilot burner flame to energize the holding electromagnetic means, core 70 and coil 72, the push button may be released whereupon the armature 62 is held in its attracted position and both valve seats 36 and 54 are open. Inasmuch as the thermostatically operated valve 28 is open, fuel flows to the main burner 34 which is ignited by the flame of the pilot burner 22.

When the temperature sensed by the bulb 302 reaches the selected temperature, the bellows 304 biases the housing 310 so that the actuator 116 closes the valve 28 whereby the main fuel flow is cut off and the main burner 34 is extinguished. A subsequent decrease in the sensed temperature, reverses the operation so that the valve 28 is opened again. During normal operation the main burner 34 will be cycled thermostatically as outline above to maintain the selected temperature.

Should the flame at the pilot burner 22 be extinguished from any cause, the thermocouple 88 will cool and the thermoelectric current to the magnet coil 72 will cease; thereupon the armature 62 will be released from the magnet core 70 under the bias of the coil spring 68, which closes the valve member 58 on the valve seat 54 to effect 100% shut off of all fuel flow. In order to place the system in operation again, the resetting procedure outlined above must be repeated.

Should the temperature sensed by the bulb 302 reach an abnormally high level, the bellows 304 will expand abnormally moving arm 315 against the bias of its coil spring 322 causing contact 316 to engage contact 318 to ground out the electromagnetic coil 72. Thus, the thermoelectric circuit from the thermocable lead 87 and conductor 86 is shorted through the lead 224, bridge 321, contact 318, contact 316 and arm 315 to the ground terminal screw on which the arm is mounted. In the event the bulb 302, the capillary tube 303 or the bellows 304 is punctured and the fluid therein is released, the bellows 304 would normally compress under the force of spring 322 acting against it and contact 316 would engage contact 317 which would also short-out the electromagnetic coil 72 to shut down the device under this kind of failure.

FIG. 3 illustrates a control quite similar to that illustrated in FIG. 2 and includes a similar bulb and bellows arrangement. An arm 323 has one end fixedly attached to the housing 310 and another end with a pair of buttons 324 and 328 mounted on opposite sides thereof. A pair of normally closed switches 180b are placed in spaced relation to opposite sides of the arm 323 and are connected in series by lead 326. A pair of insulated leads 220 and 222, one for each of the switches 180b, are connected to electromagnet's conductor 78 and the thermocouple cable conductor 86, respectively.

The switches 180b are of a normally closed variety and therefore under the normal operating conditions illustrated in FIG. 1, there would be electrical continuity between the two insulated leads 220 and 222. Thus, under an extremely high temperature condition, the bellows 304 would expand until protuberance 325 engaged its switch 180b to open the same and break the circuit between the two leads 220 and 222. This opening of the circuit would cause deenergization of the electromagnet to shut down the entire system. In the event the bulb 302, the capillary 303 or the bellows 304 was perforated, the fluid therein would escape allowing the bellows 304 to collapse under the influence of spring 322, and protuberance 324 on the arm 323 would engage its switch 180b thereby opening the circuit to shut down the entire system.

With reference to FIGS. 2 and 3, it is readily apparent that the position of the bellows operated arm might be placed on any part of the bellows either directly or indirectly in contact with it, and still serve the purpose of the present invention and, alternatively, the position of the contacts or the switches might be varied without departing from the scope of the present invention. It should also be noted that while the resetting procedure may be accomplished after a complete system shut down as outlined above, the condition which caused the shut down must be corrected before normal operation resumes. That is, a defective bellows or an abnormal temperature condition would still influence the thermoelectric circuit so that the electromagnet holding means could not be energized; thus, upon release of the reset button, 100% shut off would occur again.

Inasmuch as the present invention is subject to many other modifications, variations and changes in detail, it is intended that all matter contained in the foregoing description or shown in the accompanying drawing shall be interpreted as illustrative and not in a limiting sense.

What is claimed is:

1. In a thermostatic control device for controlling operation of fuel burner apparatus, the combination comprising a casing having inlet and outlet means and flow passage means therebetween, main valve control means in said passage means movable between controlling positions, thermoelectric means including safety shut-off means in said passage means and electromagnetic means adapted to be energized for holding said safety shut-off means in an open position, thermoelectric circuit means for energizing said electromagnetic means, temperature sensor means including a single bellows having movements to expand and contract in response to remote temperature variations, means defining an operative connection between said bellows and said control means for moving the same between its controlling positions by normal movements of said bellows in response to normal temperature variations, switch means exteriorly carried by said casing and electrically connected in said circuit means for deenergizing said electromagnetic means, and an operator arm moved by said bellows to operate said switch means, said operator arm being spaced from said switch means so that only abnormal movements of said bellows causes said operator arm to actuate said switch means.

2. The invention as recited in claim 1 wherein said switch means comprises a pair of grounding contacts connected in series and engageable by said operator arm to define electrical grounding means for said circuit means.

3. The invention as recited in claim 1 wherein said switch means comprises a pair of normally closed switches connected in series to define electrical breaking means for said circuit means.

4. The combination as recited in claim 1 wherein said means defining an operative connection comprises a housing pivotally carried by said casing, and said bellows, said operator arm and said switch means are disposed in said housing.

References Cited

UNITED STATES PATENTS

| | | | |
|---|---|---|---|
| 2,773,649 | 12/1956 | Hilgert | 236—21 |
| 2,879,358 | 3/1959 | Hilgert | 236—21 X |

EDWARD J. MICHAEL, *Primary Examiner.*